United States Patent [19]

Parker et al.

[11] Patent Number: 4,625,104

[45] Date of Patent: Nov. 25, 1986

[54] DUAL SCAN OPTICAL PATTERN TRACER

[75] Inventors: Robert E. Parker, Dundas; Ronald J. Luker, Hamilton, both of Canada

[73] Assignee: Westinghouse Canada Inc., Hamilton, Canada

[21] Appl. No.: 626,221

[22] Filed: Jun. 29, 1984

[30] Foreign Application Priority Data

Aug. 26, 1983 [CA] Canada .................................. 435492

[51] Int. Cl.⁴ .............................................. G05B 1/00
[52] U.S. Cl. .................................... 250/202; 250/234; 318/577
[58] Field of Search ............... 250/202, 234, 235, 236; 318/577

[56] References Cited

U.S. PATENT DOCUMENTS 3,727,120  4/1973  Jewell et al. ........................ 250/236

Primary Examiner—Gene Wan
Attorney, Agent, or Firm—Edward H. Oldham

[57] ABSTRACT

The present invention applies to a circular scanning optical pattern tracer of the non-steering type. The scanner includes the normal circular scanning mirror and sensor and in addition a further circular scanning mirror and sensor to produce a scan of greater diameter than the normal scan. The signal from the second scan is used to indicate rapid changes of direction of the pattern by gating the produced signal through a gate produced from the normal scan.

6 Claims, 5 Drawing Figures

DUAL SCAN OPTICAL PATTERN TRACER

BACKGROUND OF THE INVENTION

FIELD OF THE INVENTION AND RELATED ART

The present invention relates to optical line tracers and in particular to those optical line tracers of the circular scanning, non-steering type shown, for example in U.S. Pat. No. 3,704,372 issued Nov. 28, 1972 to Robert E. Parker, et al; U.S. Pat. No. 3,727,120 issued Apr. 10, 1973 to George S. Jewell, et al; U.S. Pat. No. 3,860,862 issued Jan. 14, 1975 to William Dell, et al; U.S. Pat. No. 3,883,735 issued May 13, 1975 to Francis P. Murphy, et al. These tracers normally scan the pattern by reflecting a portion of the pattern from a mirror onto an optically sensitive device. The mirror is rotated to cause the portion of the pattern viewed to rotate about a centre and produce a circular scan. The signal produced by the optically sensitive device may then be processed and produce co-ordinate velocity signals which may be used to cause the tracer to follow the pattern at a constant tangential velocity.

All pattern followers must view the pattern at a point in advance of the actual axis of rotation or steering of the apparatus. Failure to provide sufficient advance will result either in system instability or in the inability of the pattern follower to trace a pattern which deviates from a straight line. The degree of advance is related to the accuracy of tracing and so a trade-off is required between the stability of the system, the accuracy of tracing and the velocity of movement of the system. These various factors establish the desired advance. It would be desirable to trace at high speed with minimum advance and thus maximum accuracy as long as the pattern did not deviate too far from a straight line and, on the other hand, to permit the tracer to negotiate rapid deviations. In order to do this it has been proposed in the past that the tracer slow down at corners or other deviations of the pattern to enable the tracer to negotiate the turns. In order to determine that a corner is about to occur it is necessary to view the pattern in advance of the actual axis of rotation location.

SUMMARY OF THE INVENTION

In non-steering systems the direction of advance is physically indeterminate. It is not possible therefore to provide an advance view of the pattern by simply physically displacing a scan in advance of the normal scan. The present system used two scan systems, one of the normal scanner for producing the desired signals to enable the pattern tracer to follow the pattern and the other, an advance signal scan which indicates deviation of the pattern from a relatively straight line.

BRIEF DESCRIPTION OF THE DRAWINGS

A clearer understanding of our invention may be had from a consideration of the following specification and drawings in which.

DESCRIPTION OF THE PREFERRED EMBODIMENT

Figure 1:
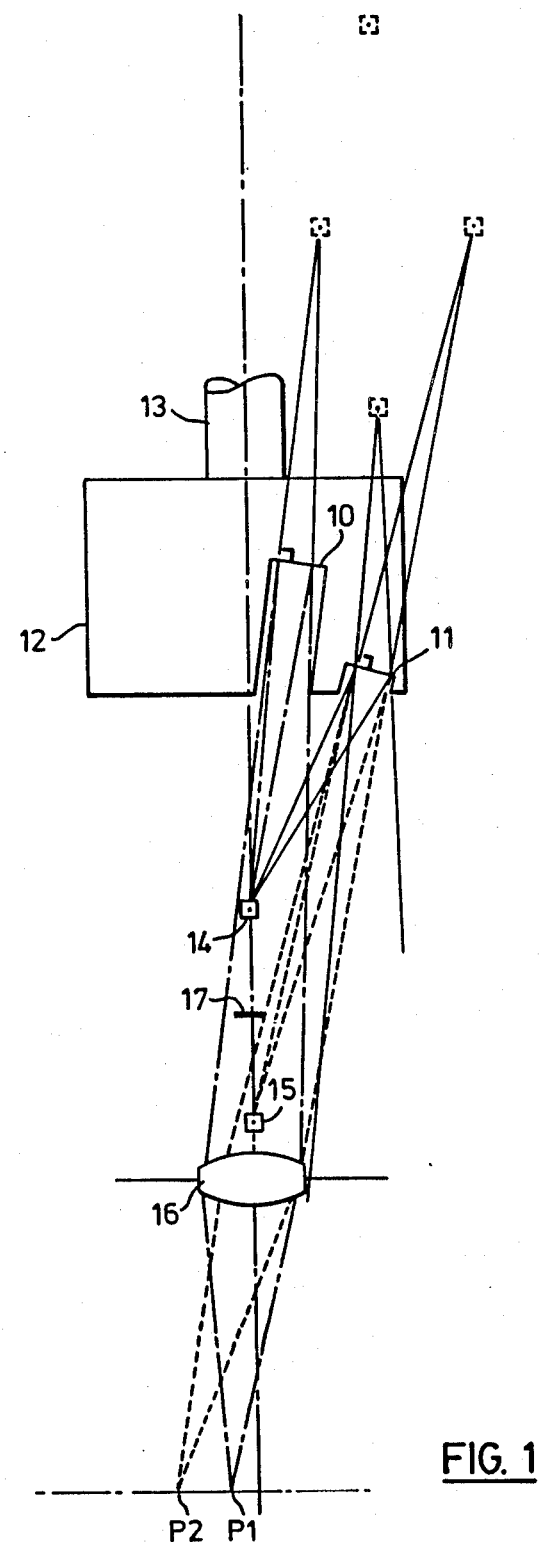
FIG. 1 is a schematic representation of a portion of a circular scanner and the optical path of the scanner.

Considering first FIG. 1, there shown a pair of mirrors 10 and 11 mounted in a carrier 12 on a shaft 13 which in turn is driven by a motor (not shown). Associated with mirror 10 is a photocell 14 and associated with mirror 11 is a photocell 15. The light rays from point P1 on the pattern converge through lens 16 and mirror 10 onto photocell 14 while the rays from point P2 on the pattern converge through lens 16 and mirror 11 onto photocell 15. A field stop 17, which is simply a circular opaque surface, is mounted between photocells 14 and 15 and blocks the rays from the short lead mirror 10 from photocell 15. The diameter of lens 16 or its aperture is such as to prevent light from point P1 falling on the long lead mirror 11.

Figure 2:
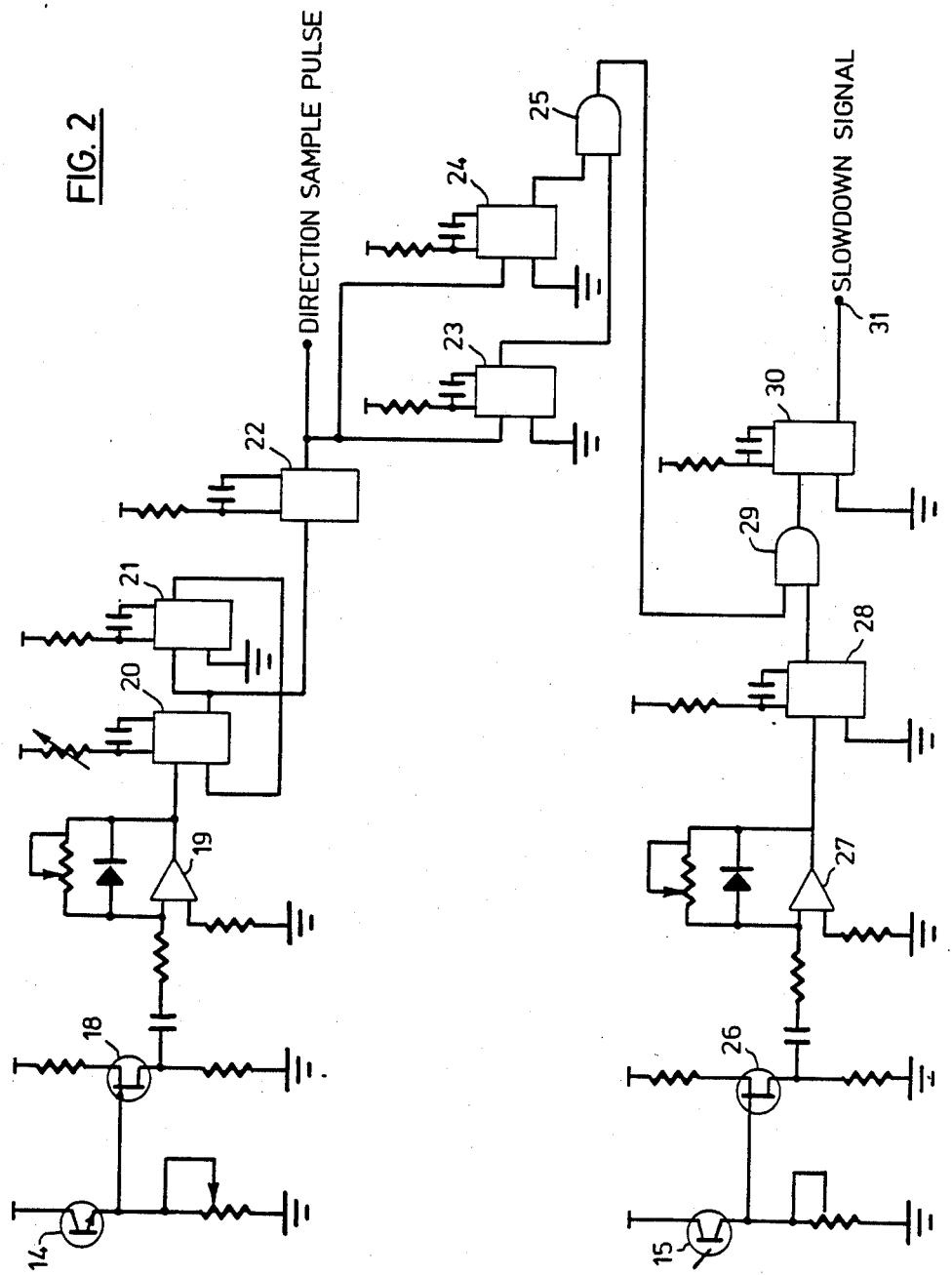
FIG. 2 is a schematic diagram of the electronic circuit associated with such a scanner.

Turning now to FIG. 2 there is shown a schematic diagram of the electronic circuit associated with the scanner. The output from photocell 14 is applied to a FET 18 and then to amplifier 19. The output from amplifier 19 is applied to the accuracy delay circuit 20, from the accuracy delay circuit 20 to the inhibit pulse generator 21. The output from the inhibit pulse generator 21 is applied to the accuracy delay circuit 20. The output from this delay circuit 20 is also applied to the sample pulse generator 22 which shapes the output into a 50 microsecond sample pulse which is used for direction control of the pattern tracer in a well-known manner described in the foregoing U.S. patents. The output from the sample pulse generator 22 is also supplied to two further pulse generators 23 and 24. Outputs from these pulse generators are applied to AND circuit 25 which produces a pulse in the presence of pulses from both generators 23 and 24.

Simultaneously, output from photo sensor 15 is also applied to a FET 26 and the output from this FET is also applied to amplifier 27 in a manner identical with the sensing and amplification of the signal from photo sensor 14. The output signal from amplifier 27 is applied to a shaping circuit 28 which produces a 50 microsecond pulse commencing with the starting point of any signal from photo sensor 15. The output pulse from shaper 28 and AND circuits 25 are applied to AND circuit 29. Output from AND circuit 29 is applied to pulse former circuit 30 which produces a slow-down signal when no output is received from AND circuit 29. This slow-down signal appears on terminal 31 and may be used to control the velocity of the tracer in a manner well-known in the art.

Figure 3:
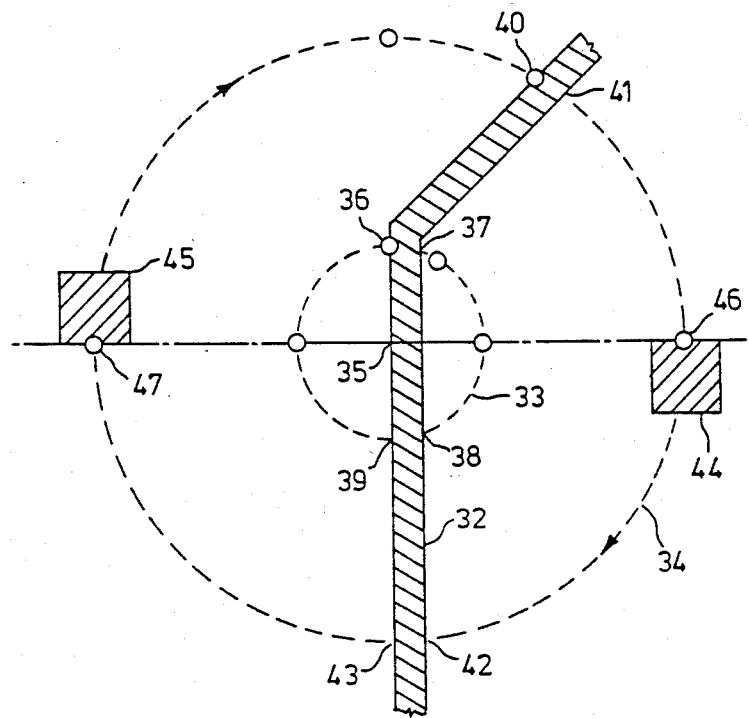
FIG. 3 is a diagramatic view of the effective scanning pattern on the pattern bearing surface.
Figure 4:
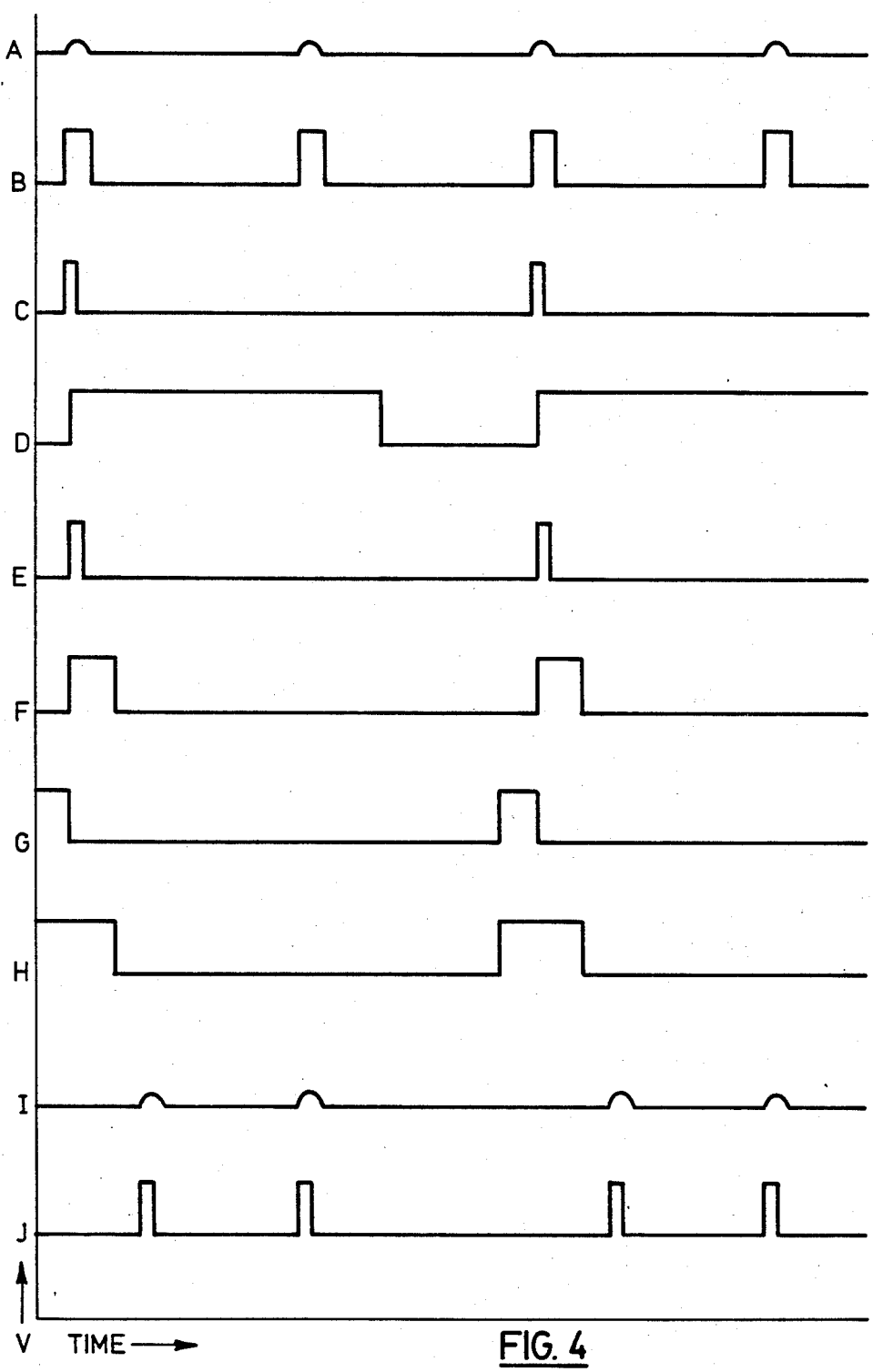
FIG. 4 is a series of graphs representing the various signals produced by the electronic circuit and their necessary time relationship.

Turning now to FIG. 3, there is illustrated the effective scanning pattern of the pattern tracer. The pattern, shown as a black line 32, is effectively scanned by two circular patterns, the first, or inner pattern, being the scan of photo sensor 14 and designated 33, the second, or larger diameter scan, being the scan of photo sensor 15 and being designated 34. Assuming the tracer to be tracing the pattern in a direction shown upward on the page and having its centre of scan at the centre shown at 35, scan 33 encounters the pattern as the scan rotates in a clockwise direction at point 36, leaves the pattern at point 37, re-encounters it at point 38 and leaves it once more at point 39. Outer diameter scan designated 34 encounters the pattern at point 40, leaves it at point 41, encounters it once more at point 42 and leaves it at point 43. The larger scan designated 34 also encounters command marks 44 and 45 at points 46 and 47 respectively. The resultant signals are shown in FIG. 4. The various wave forms are not to scale and are merely representative of the time relationship between the various signals that occur at various points in the circuit. The wave forms are designated A–J.

OPERATION

When the smaller diameter scan encounters the line, an output is produced from photocell 14 as shown at A in FIG. 4. The shape of this wave form is variable, depending upon the level of illumination, the shape of the photocell, the focus of the lens, etc. In order to eliminate as many variables as possible, the signal A is amplified in operational amplifier 19 producing an output as shown at B. Monostable 20 produces a pulse as shown at C but only when it is not inhibited by the output from monostable 21 as shown at D. Monostable 22 is triggered by the trailing edge of the pulse from monostable 20 and produces the wave form as shown at E which is the direction sample pulse which is used to control the x and y velocities of the tracer in a manner well-known in the art.

This direction sample pulse also triggers a pair of monostables 23 and 24 which produce the wave forms at F and G respectively which are applied to AND circuit 25 resulting in an output as shown at H.

The output from photo sensor 15 is shown at I and after processing in a manner similar to the signal from photo sensor 14 produces an output from monostable 28 in the form shown at J. Wave forms shown at H and J are applied to monostable 30. This monostable has a period of about 17.7 milliseconds at the normal speed of rotation of the scanner which is a synchronous scanner driven normally at 60 hertz. This period is equivalent to more than 380° of rotation of the scan. In the absence of an output from AND circuit 29, that is an absence of coincidence of the signals H and J, the monostable 30 will time out causing a signal to be applied to terminal 31 which controls a relay which in turn is used to slow down the equipment since failure to produce a coincidence in AND circuit 29 indicates that there has been a deviation of the pattern in excess of set number of degrees, for example 21.6° as shown in FIG. 3. It will therefore be seen that photo sensor 15 senses rapid deviations of the pattern and produces, in conjunction with the normal scan, a slow-down signal which can be used to control the tangential velocity of the tracer.

Figure 5:
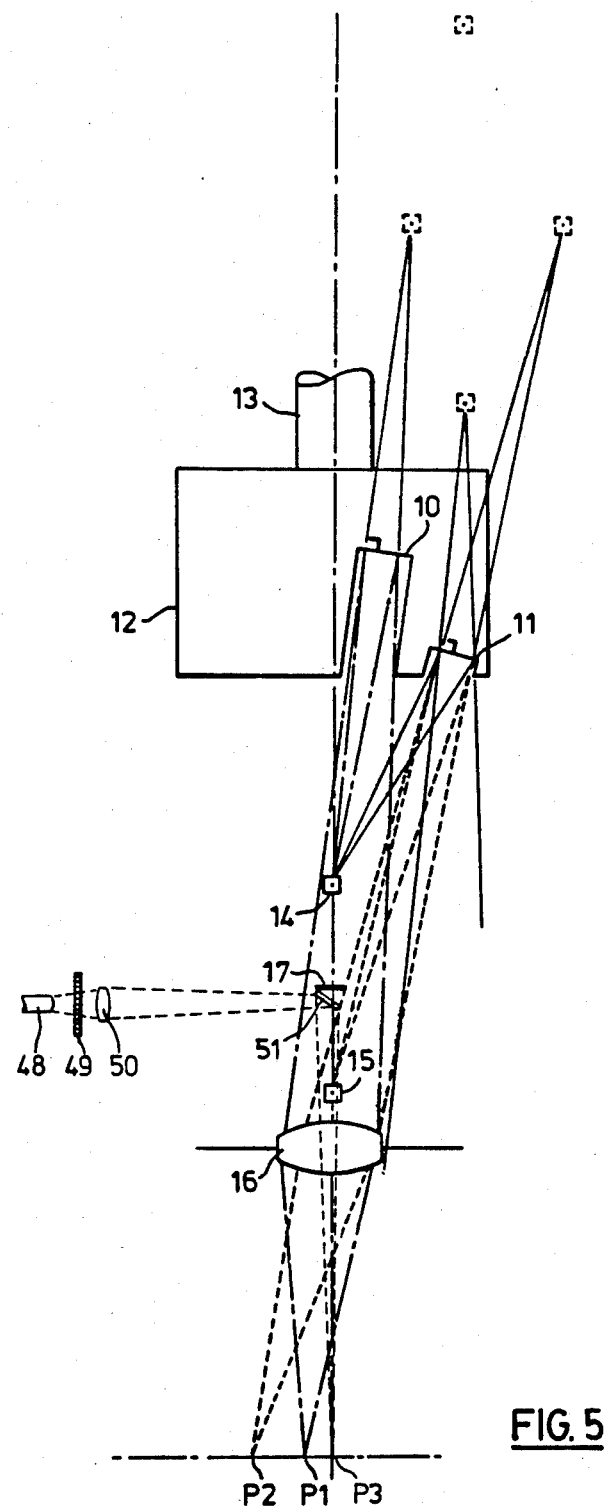
FIG. 5 is a scanner in accordance with FIG. 1 showing an additional feature.

FIG. 5 shows the scanner of FIG. 1 with an additional feature to assist in operation. A light source 48 provides light which is filtered by filter 49 and focused by lens 50 reflected by mirror 51 down the steering axis of the scanner through lens 16 and onto the pattern at point P3 which represents the intersection of the steering axis and the pattern.

By selection of the source 48 and the filter 49, a suitably contrasting light spot is projected onto the pattern at P3. The resulting light is selected to be outside the spectral response of the photo sensor 15 and thus avoid its saturation. This light spot assists the operator of the machine in properly aligning the tracer at start-up.

While the detection of coincidence of signals H and J has been used as an indication of deviation of the pattern, it will be understood that other means can be used which may be simpler, for example, it may be possible to eliminate monostables 23 and 24 and simply compare the direction sample pulse E with the advance sample pulse J and if their widths are suitable, any overlap will indicate that the pattern is not deviating substantially from a straight line. This arrangement will, of course, require that the widths and placement of the sample pulses is suitable for the purpose.

It will also be understood that while reference has been made to the application of the signal 31 to a relay to control tangential velocity, there may be advantages to having a gradual change of velocity and a ramp function can be applied rather than a step function.

It will be noted that the command marks shown on FIG. 3 are only in an area scanned by the larger diameter scan. With this arrangement it is possible to have various command marks on the pattern including command marks which will only be viewed by the sensor 14 and other command marks which will be viewed only by photo sensor 15. Outputs from the photo sensors representing command marks must be derived from the system immediately after operational amplifiers 19 and 27 respectively. After this point, the photo sensor 14 does not respond to signals outside its forward viewing area. In this way the signals representing command marks can be detected and by suitable gating circuits, well-known in the art, the signals representing the pattern can be rejected. Thus with the system disclosed, additional command marks can be placed on the pattern and be detected in the system.

While shown as operating simultaneously, it is possible to use the two scan diameters alternately. For example, by simply introducing a selector switch it is possible to use the larger diameter, long lead, scan at high speeds and the smaller diameter, short lead, scan at low speeds.

We claim:

1. A circular scanning, non-steering optical pattern follower including a synchronously driven rotating mirror carrier, a first mirror mounted to one side of the axis of rotation of said carrier and with its surface at a small angle with reference to a plane perpendicular to said axis, a second mirror mounted to one side of the axis of rotation at a distance from the axis greater than that of said first mirror and with its surface at a small, but greater, angle with reference to said plane perpendicular to said axis than said first mirror, an illuminated pattern bearing surface, a first photo-sensitive device to receive light reflected from said pattern-bearing surface onto said first mirror, a second photo-sensitive device to receive light reflected from said pattern-bearing surface onto said second mirror, means to derive electrical signals from said first and second photo-sensitive devices and means to utilize said electrical signals to control the movement of said pattern follower.

2. A pattern follower as claimed in claim 1 including a field stop to prevent light reflected from said first mirror from reaching said second photo-sensitive device.

3. A pattern follower as claimed in claim 1 wherein the optical path of said follower is arranged to prevent light from said second mirror reaching said first photo-sensitive device.

4. A pattern follower as claimed in claims 1, 2 or 3 including a light source and means to project the light from said source along the said axis of rotation onto the pattern-bearing surface.

5. A pattern follower as claimed in claim 1 including means to determine the relative time of occurrence of the electrical signals derived from said first and second photocells and means to control the tracer in accordance with variations in said time of occurrence.

6. A pattern follower as claimed in claim 1 wherein said mirrors are both displaced from the axis in the same angular direction and including means to control the tracing velocity of said tracer in accordance with the degree of coincidence of the electrical signals derived from said first and second photo-sensitive devices.

* * * * *